United States Patent [19]

Meshman et al.

[11] Patent Number: 4,550,374

[45] Date of Patent: Oct. 29, 1985

[54] HIGH SPEED ALIGNMENT METHOD FOR WAFER STEPPER

[75] Inventors: Boris Meshman; Thomas A. Kerekes; Lawrence S. Green; David Karlinsky, all of Canoga Park, Calif.

[73] Assignee: TRE Semiconductor Equipment Corporation, Woodland Hills, Calif.

[21] Appl. No.: 441,413

[22] Filed: Nov. 15, 1982

[51] Int. Cl.⁴ .................. G06F 15/46; H05K 13/00; H04N 7/18

[52] U.S. Cl. .................. 364/490; 364/559; 356/401; 358/101

[58] Field of Search ............... 364/488, 489, 491, 490, 364/525, 571, 559; 356/401; 358/101

[56] References Cited

U.S. PATENT DOCUMENTS

| | | | |
|---|---|---|---|
| 3,670,153 | 6/1972 | Rempert et al. | 364/491 X |
| 3,955,072 | 5/1976 | Johannsmeier et al. | 364/490 X |
| 3,988,535 | 10/1976 | Hickman et al. | 364/559 X |
| 4,103,998 | 8/1978 | Nakazawa et al. | 364/490 X |
| 4,154,530 | 5/1979 | Connolly, Jr. et al. | 364/559 X |
| 4,233,625 | 11/1980 | Altman | 364/559 X |
| 4,301,470 | 11/1981 | Pagany | 364/559 X |
| 4,328,553 | 5/1982 | Fredriksen et al. | 364/559 |
| 4,342,090 | 7/1982 | Caccoma et al. | 364/491 |
| 4,465,350 | 8/1984 | Westerberg | 364/491 X |
| 4,475,122 | 10/1984 | Green | 358/101 |

Primary Examiner—Edward J. Wise
Attorney, Agent, or Firm—Spensley, Horn, Jubas & Lubitz

[57] ABSTRACT

A step-and-repeat exposure system incorporates a method for achieving die-by-die alignment at high speed in order to increase the throughput of the system. In order to align circuit patterns which are to be exposed onto a semiconductor wafer in an overlapping fashion, the wafer is initially moved to a target position in order to view an alignment target previously formed on the wafer, and is subsequently moved to an exposure position. The movement to the exposure position is controlled as a function of the calculated position of the alignment target. The method involves initiating the video scan to view the alignment target prior to the stage coming to a complete rest at the target position. The characteristics of the stage motion are determined and the acquisition of the video data is initiated as soon as the oscillation of the stage has subsided by an acceptable amount. By initiating the video scan at an early point, a significant decrease in the alignment time at each die site is achieved.

8 Claims, 11 Drawing Figures

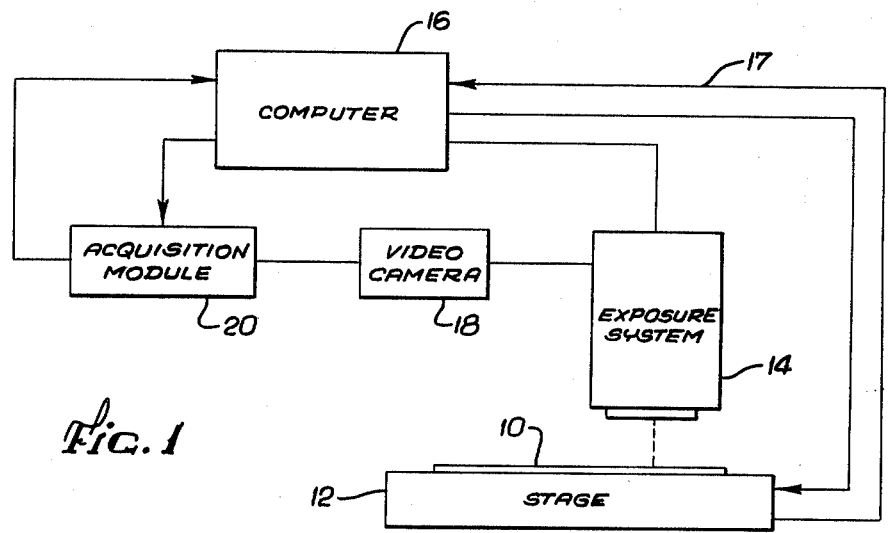
Fig. 1
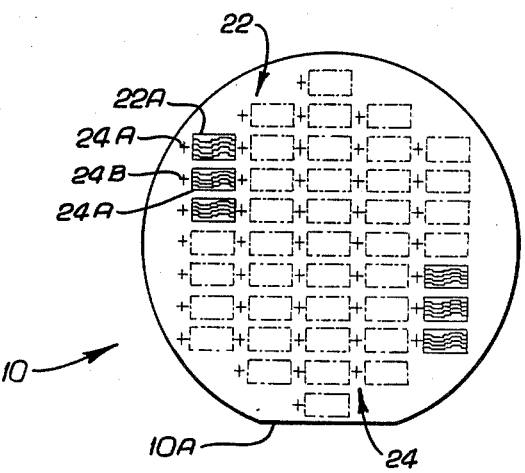
Fig. 2
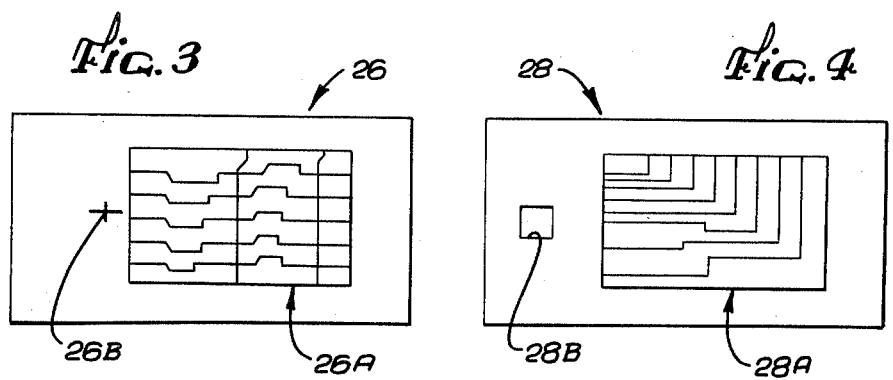
Fig. 3
Fig. 4

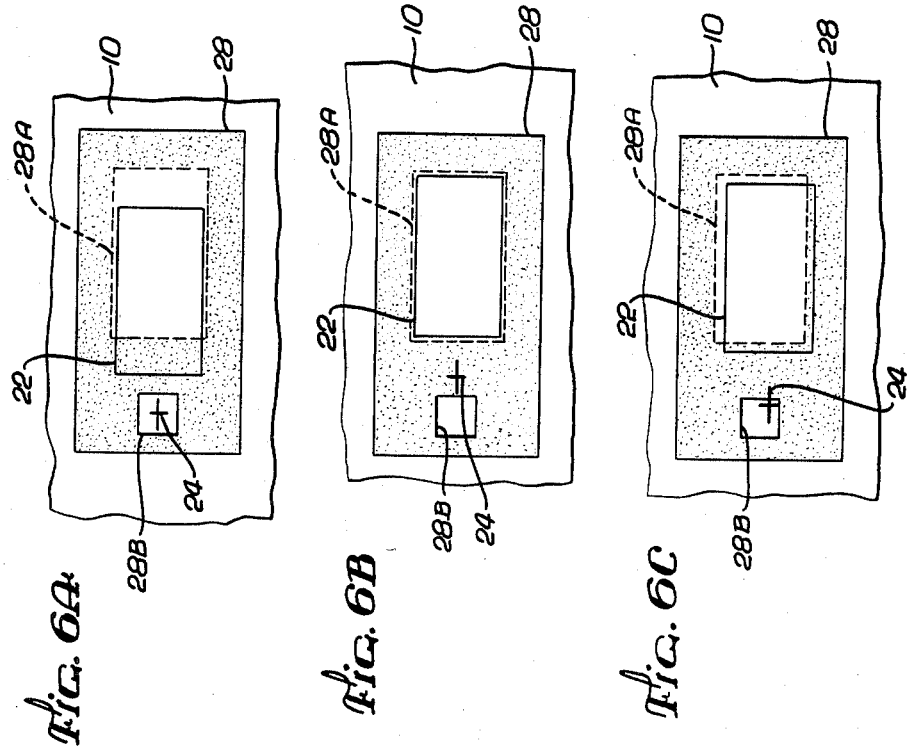
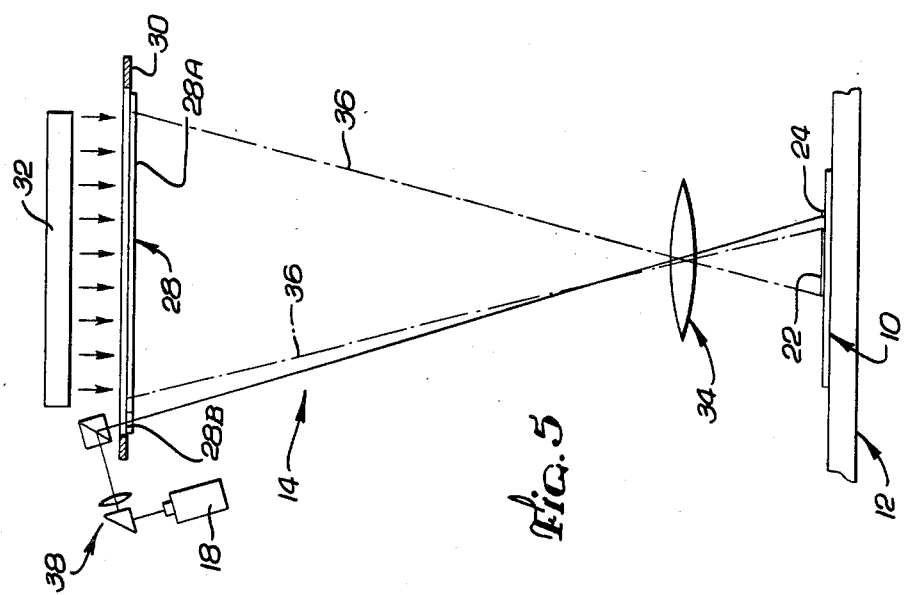

HIGH SPEED ALIGNMENT METHOD FOR WAFER STEPPER

BACKGROUND OF THE INVENTION

1. Field of the Invention

This invention relates to exposure systems for forming integrated circuits on semiconductor wafers. More particularly, the present invention relates to step and repeat exposure systems and a method of increasing the production capability of such systems.

2. Description of the Prior Art

In conventional integrated circuit fabrication, a semiconductor wafer typically undergoes from 4 to 10 major process steps, at each of which steps part of a circuit pattern is exposed from a mask or reticle onto the wafer. In "step-and-repeat" processing, an enlarged mask, typically ten times actual size, contains the circuit pattern for one or a very few individual die sites. The wafer is positioned at one of these die sites, and a reduced image of the mask pattern is exposed onto photoresist covering the wafer through a size reducing system. The wafer is then stepped to the next die site and the mask exposure is repeated. The step-and-repeat operation continues until all die sites have been exposed.

For optimum yield, the pattern images of each subsequent mask must be formed in perfect registration with the circuit elements formed during prior steps. As a minimum, this requires that prior to exposure by each subsequent mask, the wafer must be perfectly located and aligned in the step-and-repeat apparatus, and must be accurately stepped from one die site to the next. Optimally, an individual alignment should be performed at each die site. Such die-by-die alignment is preferred since distortion of the wafer may occur during individual process steps. As a result, although exact uniform spacing existed between the circuit at individual die sites during earlier process steps, the spacing may differ slightly during successive steps. If the wafer is then merely moved a fixed distance from site to site, without individual site alignment, misregistration may occur at some or all of the die sites during exposure of the masks used for these later processing steps.

The speed at which both initial wafer alignment and die-by-die alignment is achieved must be minimized. Step-and-repeat exposure systems are very expensive, typically costing hundreds of thousands of dollars. For cost effective use of such equipment, the time for processing each wafer must be minimized. One way of achieving this is to automate all alignment operations so that no operator intervention is required throughout the entire wafer alignment and step-and-repeat exposure operation.

Techniques for die-by-die alignment have been suggested in the past. Various systems are shown in U.S. Pat. No. 4,052,603 to Karlson and U.S. Pat. No. 4,153,371 to Koizumi, as well as in copending U.S. patent application Ser. No. 238,148 entitled SINGLE LENS REPEATER and assigned to TRE Corporation, the assignee of the present application.

Typically, the initially exposed mask contains both the circuit pattern for the intial processing step and an alignment target which is exposed onto the wafer along with the circuit pattern itself. Typically, this wafer alignment target is exposed in the alley along which the wafer ultimately will be scribed to separate the individual circuit chips.

During the initial processing step the exposed wafer alignment target is subjected to the same processing as the circuit pattern itself. For example, this may comprise the diffusion of an N- or P- type dopant into the semiconductor wafer. In this manner, a die alignment target is formed in the wafer at each die site. It is this alignment target which is used during subsequent mask exposure steps to accomplish die-by-die alignment.

Beginning with the second mask, each mask is provided both with the requisite circuit pattern and with a reticle alignment window or target. This window is a specific distance away from the center of the circuit on the reticle and is outside the normal exposure area of the lens used to expose the circuit pattern onto the wafer. For die-by-die alignment, the wafer is stepped to a target position and appropriate viewing optics are used to view the alignment target on the wafer through the window on the reticle. The position of the target within the window is determined in order to facilitate calculation of the position of the wafer pattern relative to the reticle. After viewing, the wafer must be moved in order to bring the entire pattern within the exposure area of the lens. If the alignment target were viewed precisely at its expected position, this movement is a fixed, predetermined amount which simply compensates for the difference in positioning of the window and alignment target relative to their respective circuit patterns. If the alignment target was viewed at some position other than its expected position, the movement of the wafer is modified in order to correct for any offset. At the end of the movement, the circuit pattern on the reticle is in perfect registration with the pattern on the wafer and an exposure is made.

The wafer is carried on a stage whose position is typically determined by means of laser interferometers. Such interferometers provide extremely precise positional measurements. In prior art systems, the viewing of the alignment target through the window on the reticle is not commenced until the interferometers indicate that the wafer has come to an extremely stable rest at the target position. When stopping at the target position, the stage takes some time to settle precisely at the target position. In order to insure that the wafer has completely settled at the target position, prior art systems wait for a relatively long period of time after the wafer had initially arrived at the target position before viewing the target through the window. Typically, the period between initial arrival of the wafer at the target position and initiation of the acquisition of video data is several tenths of a second.

Due to the extremely high cost of step-and-repeat systems, the throughput of such systems, i.e., the speed at which wafer processing can be accomplished, is critical if cost effectiveness is to be achieved. This is particularly so when die-by-die alignment is done, since alignment of each die necessarily increases the processing time of the system. In order to maintain maximum line resolution in the circuits being formed, the overlapping patterns must be exposed in precise registration. However, it is difficult to maintain such resolution without significantly reducing the throughput of the system. Because each wafer may contain hundreds of die sites, a savings of a few milliseconds in the alignment procedure at each die site can result in a very significant decrease in the overall processing time of the wafer. It is therefore an object of the present invention to increase the throughput of such a system while maintaining precise registration.

SUMMARY OF THE INVENTION

The present invention is directed to a method of aligning the circuit pattern previously formed on the wafer to a reticle pattern which results in a significantly increased throughput for the system. This is accomplished by initiating the acquisition of video data at the earliest possible time after the wafer has arrived at the target position. In order to accomplish this, the damping characteristics of the stage are determined and the acquisition of video data is intiated as soon as the interferometers indicate that the wafer has been close enough to the target position so that the target is in full view of the TV window. The wafer is still moving but at a velocity so low that the TV data is not blurred. In the present embodiment of the invention, a stable position reading for an average of approximately twenty-five milliseconds is sufficient. This is to be contrasted with the several hundred milliseconds delay in prior art systems. By acquiring video data used in determining the position of the alignment target at the earliest possible time, the time to achieve alignment at each die site is greatly reduced and the operating efficiency of the system is increased.

BRIEF DESCRIPTION OF THE DRAWINGS

The invention will now be described with reference to the accompanying drawings, wherein:

FIG. 1 is a block diagram of a step-and-repeat system according to the present invention;

FIG. 2 is a plan view of a semiconductor wafer showing a number of circuit patterns and associated alignment targets formed thereon;

FIG. 3 is a plan view of a reticle used for an initial exposure. This reticle includes a circuit pattern and an associated alignment target;

FIG. 4 is a plan view of a reticle used for a subsequent exposure. This reticle contains a circuit pattern and an alignment window;

FIG. 5 is a diagrammatic view of the exposure system of the invention;

FIGS. 6. A-C are plan views of overlapping circuit patterns during various stages of the alignment procedure.

FIG. 8 is a flow chart of the inventive high speed alignment method for a wafer stepper.

DESCRIPTION OF THE PREFERRED EMBODIMENT

Figure 7A:
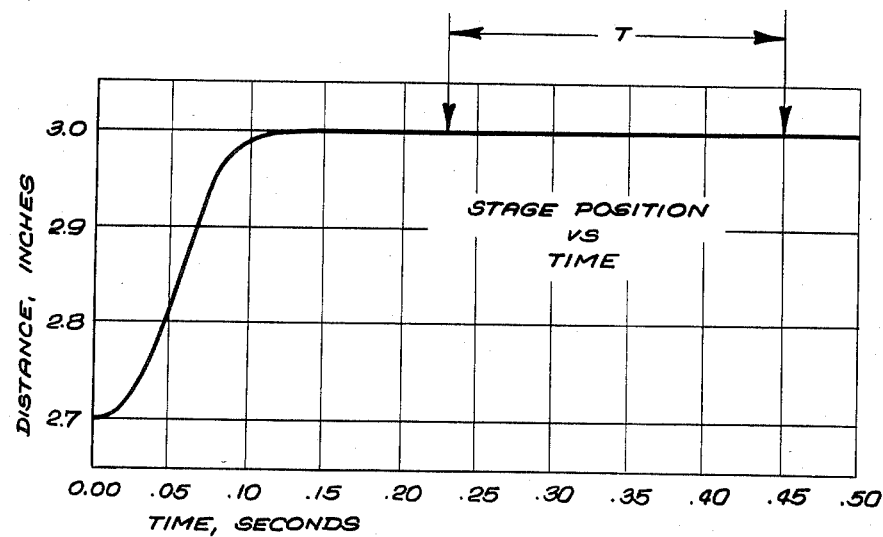
FIGS. 7A and B are graphs showing stage position error with respect to time.

Referring to FIG. 1, a semiconductor wafer 10 covered with photoresist is carried on a stage 12 which is movable along X and Y axes and may also be finely rotatable. Circuit patterns are exposed onto the photoresist in a step-and-repeat fashion by means of an exposure system 14. During each processing step of the wafer 10, a new circuit pattern is exposed in an overlapping relation with circuit patterns already on the chip.

The stage is moved under control of a computer 16. The computer receives position signals on line 17 from laser interferometers (not shown) which provide extremely accurate indications of the position of the stage. A video camera 18 is used to view the circuit patterns exposed on the wafer 10, and provides video signals to an acquisition module 20. The acquisition module in turn provides the video data to the computer 16.

As can be seen in FIG. 2, the wafer 10 includes a flat edge 10A which is used to position the wafer with respect to the stage 12. In FIG. 2, the wafer is shown having a plurality of first circuit patterns 22 formed thereon. Each circuit pattern includes an associated alignment target 24 which is spaced a predetermined distance from the pattern. For example, a circuit pattern 22A includes an associated alignment target 24A and a pattern 22B includes an associated alignment target 24B. Each of the circuit patterns and associated alignment targets is formed by exposing a pattern contained on a reticle on the exposure system 14 in a step-and-repeat fashion across the surface of the wafer 10.

FIG. 3 shows a reticle 26 which is used to form the circuit patterns 22 and alignment targets 24. The reticle includes a circuit pattern 26A and alignment target 26B which are used to form the patterns and targets on the wafer 10. Typically, the pattern on the reticle 26 is ten times the size of the image which is formed on the wafer 10. The reticle is positioned within the exposure system 14 and an image of the circuit pattern and alignment target is projected onto the wafer 10.

FIG. 4 shows a reticle 28 which is used to form a subsequent circuit pattern on the wafer 10 in an overlapping relationship with respect to previously formed circuit patterns. The reticle 28 includes a circuit pattern 28A. and a window 28B which is spaced a predetermined distance from the center of the circuit pattern 28A.

The exposure system 14 is shown in more detail in FIG. 5. A reticle is carried on a reticle holder 30. A light source 32 illuminates the reticle to form an image of the circuit pattern on the wafer 10 through a reduction lens 34. Typically, a 10× reduction system is employed.

The reticle 26 is used during the initial exposure operation. The alignment target 26B is spaced relatively close to the circuit pattern 26A and is within the field of exposure of the lamp 32 and lens 34. Therefore, images of both the pattern 26A and targe 26B will be formed on the wafer 10 during an exposure operation. The exposure area for the exposure system 14 is indicated by dashed lines 36.

During subsequent step-and-repeat exposure operations, reticles such as the reticle 28 are employed. The reticle 28 is shown held by the reticle holder 30 in FIG. 5. The reticle, as well as any additional reticles which are used for subsequent exposure operations, includes a window 28B which is spaced from the center of the circuit pattern 28A by a sufficient distance such that it is out of the exposure area of the lens 34. In order to obtain alignment between a circuit pattern 22 on the wafer and the circuit pattern 28a on the reticle 28, the alignment target 24 is viewed through the window 28B by means of the video camera 18. This viewing is accomplished through the reduction lens 34 and suitable optics 38.

After an exposure has been made, the stage 12 is moved to a target position (i.e., a predetermined position as determined by the interferometers) so as to position a new die site underneath the lens 34 (FIG. 8, block 81). If the wafer 10 is perfectly positioned, the alignment target 24 will be centered within the window 28B when the stage arrives at the target position, as illustrated in FIG. 6A. Because of the different spacing between the alignment target 24 and window 28B and their respective circuit patterns, the wafer must subsequently be moved to an exposure position by a distance corresponding to the difference in spacing in order to achieve alignment between the circuit pattern 22 already formed on the wafer 10 and the image of the new circuit pattern 28A which is to be exposed in an overlapping relationship with the pattern 22. After this movement, the relationship between the reticle 28 and the wafer 10 will be as shown in FIG. 6B.

In the normal situation, the image of the alignment target 24 will not be precisely centered within the window 28B when the stage is moved to the target position. Instead, the target 24 will be offset somewhat within the window, as illustrated in FIG. 6C. This offset between the actual and desired location of the alignment target 24 (and thus the circuit pattern 22) must be compensated for when the wafer is moved from the target position to the exposure position. That is, the movement of the wafer must be controlled so that it moves from the position shown in FIG. 6C to the position shown in FIG. 6B if precise registration between the circuit patterns 22 and 28A is to be achieved.

When a circuit pattern is to be exposed, the stage 12 is initially moved to a predetermined target position and the alignment target 24 is viewed through the window 28B by means of the video camera 18. In the present embodiment of the invention, the camera 18 continuously scans the area of the wafer 10 which is located under the window 28B of the reticle 28. However, video data from a scan is not acquired by the acquisition module 20 until the position of the stage 12 corresponds to the target position (block 82). The interferometers which measure the position of the stage 12 provide signals to the computer 16, which in turn provides a control signal to the acquisition module 20 instructing it to obtain data from a video scan (block 84). The acquisition of data by the module 20 takes between 1/30 and 1/60 of a second. Immediately after the data has been acquired, movement of the stage toward an expected exposure position is begun. While the stage is moving, the video data in the acquisition module 20 is transferred to the computer 16 (block 85) and the computer determines the position of the alignment target 24 within the window 28B (block 86). The computer thus calculates the offset between the actual position of the target 24 and its desired position (block 87). This offset is then used to alter the control signals to the stage 12 so that the wafer will be moved to the proper exposure position as indicated in FIG. 6B (block 88).

Various methods may be used to make the actual determination of the position of the alignment target within the window. One method is disclosed in U.S. Pat. No. 4,475,122, filed Nov. 9, 1981 and assigned to TRE Corporation, the same assignee as the present application. The specifics of the position determination procedure are not critical to the present application and will therefore not be described in detail.

The time it takes for the system of FIG. 1 to acquire video data after the stage has arrived at the target position is critical to the throughput of the system. Since an alignment is accomplished at each die site, a reduction in alignment time of even a few milliseconds will significantly increase the throughput of the system.

Figure 7B:
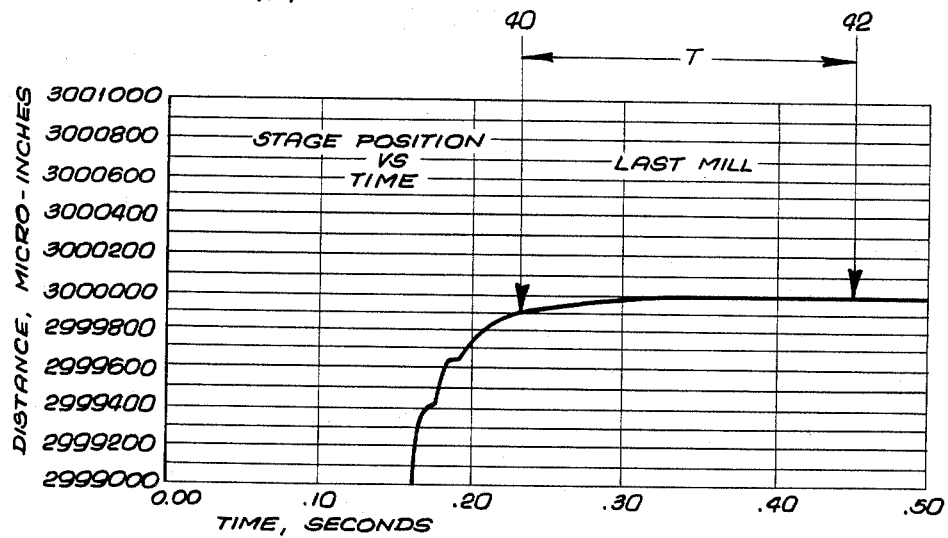

Table 1 and FIG. 7 show interferometer measurements at short time intervals (less than 0.01 seconds) of the position of the stage as it is moved to the target position. For purposes of illustration, an interferometer graph is shown for only the X axis of the stage.

TABLE 1

| Time | X | Y | Time | X | Y |
|------|---|---|------|---|---|
| .000 | 2700001 | 3000002 | .254 | 2999934 | 2999995 |
| .008 | 2700714 | 3000075 | .259 | 2999939 | 2999994 |
| .013 | 2704451 | 2999997 | .264 | 2999943 | 2999994 |
| .017 | 2710934 | 2999983 | .268 | 2999945 | 2999994 |
| .022 | 2719680 | 3000025 | .273 | 2999950 | 2999994 |
| .027 | 2731354 | 2999972 | .278 | 2999954 | 2999994 |
| .032 | 2745445 | 3000020 | .283 | 2999959 | 2999994 |
| .037 | 2762147 | 2999999 | .288 | 2999962 | 2999994 |
| .042 | 2781514 | 2999972 | .293 | 2999967 | 2999994 |
| .046 | 2803343 | 3000009 | .297 | 2999971 | 2999995 |
| .051 | 2826784 | 2999939 | .302 | 2999973 | 2999997 |
| .056 | 2849937 | 2999972 | .307 | 2999978 | 2999997 |
| .061 | 2871899 | 3000042 | .312 | 2999982 | 2999999 |
| .066 | 2894643 | 3000022 | .317 | 2999985 | 3000000 |
| .070 | 2917439 | 2999913 | .322 | 2999987 | 3000000 |
| .075 | 2936675 | 2999997 | .326 | 2999990 | 3000000 |
| .080 | 2953188 | 3000037 | .331 | 2999992 | 3000000 |
| .085 | 2966823 | 2999992 | .336 | 2999993 | 3000002 |
| .090 | 2977304 | 3000016 | .341 | 2999995 | 3000002 |
| .095 | 2985187 | 2999953 | .346 | 2999995 | 3000002 |
| .099 | 2989951 | 3000002 | .350 | 2999996 | 3000002 |
| .104 | 2991820 | 3000030 | .355 | 2999996 | 3000002 |
| .109 | 2992360 | 3000065 | .360 | 2999996 | 3000002 |
| .114 | 2993752 | 2999969 | .365 | 2999996 | 3000002 |
| .119 | 2995365 | 2999941 | .370 | 2999996 | 3000002 |
| .124 | 2995836 | 3000017 | .375 | 2999996 | 3000002 |
| .129 | 2996363 | 3000030 | .379 | 2999996 | 3000002 |
| .133 | 2997393 | 2999974 | .384 | 2999996 | 3000002 |
| .138 | 2997852 | 2999970 | .389 | 2999996 | 3000002 |
| .143 | 2997886 | 3000005 | .394 | 2999996 | 3000002 |
| .148 | 2998436 | 3000002 | .399 | 2999996 | 3000002 |
| .153 | 2998866 | 2999995 | .404 | 2999996 | 3000002 |
| .157 | 2998863 | 3000003 | .408 | 2999996 | 3000002 |
| .162 | 2999001 | 2999999 | .413 | 2999996 | 3000002 |
| .167 | 2999353 | 2999995 | .418 | 2999996 | 3000002 |
| .172 | 2999405 | 3000009 | .423 | 2999996 | 3000002 |
| .177 | 2999420 | 3000006 | .428 | 2999998 | 3000002 |
| .182 | 2999570 | 2999997 | .432 | 2999998 | 3000002 |
| .186 | 2999672 | 3000008 | .437 | 2999998 | 3000002 |
| .191 | 2999668 | 3000009 | .442 | 2999999 | 3000002 |
| .196 | 2999722 | 3000005 | .447 | 2999999 | 3000002 |
| .201 | 2999791 | 3000008 | .452 | 2999999 | 3000002 |
| .206 | 2999830 | 3000006 | .457 | 2999999 | 3000002 |
| .211 | 2999842 | 3000006 | .461 | 2999999 | 3000002 |
| .215 | 2999864 | 3000006 | .466 | 2999999 | 3000002 |
| .220 | 2999878 | 3000006 | .471 | 2999999 | 3000002 |
| .225 | 2999890 | 3000005 | .476 | 2999999 | 3000002 |
| .230 | 2999903 | 3000003 | .481 | 3000001 | 3000002 |
| .235 | 2999912 | 3000003 | .486 | 3000001 | 3000002 |
| .240 | 2999920 | 3000002 | .490 | 3000001 | 3000002 |
| .244 | 2999926 | 2999999 | .495 | 3000001 | 3000002 |
| .249 | 2999931 | 2999997 | .500 | 3000001 | 3000002 |

In Table 1 and FIG. 7, the commanded X position for the stage corresponds to an interferometer reading of 3000000. As the stage nears this target position, it slows to a very low velocity, requiring almost as much time to traverse the final one hundred microinches as it took to move the entire initial portion of the move. Thus, although the stage initially reaches the target vicinity (i.e., position 299990) at time 0.23 its position is not absolutely stable until about time 0.35. As is clear from FIG. 7, the stage velocity begins at a relatively high value and gradually reduces until the stage reaches the absolutely stable position. Once this position has been reached, the acquisition module 20 may be activated in order to acquire data from a video scan by the camera 18. By waiting until the stage has completely settled (i.e., until the interferometer indicates within tolerance for a relatively long period of time), precise video data can be obtained. However, the resulting throughput of the system is relatively low, since a substantial amount of time is required for each alignment.

In order to increase the throughput of the system while maintaining the integrity of the data, the present invention utilizes the computer 16 to control the acquisition of video scan data at a point prior to the stage coming to a complete rest but after the stage has settled to a degree at which valid data may be obtained (blocks 82-85). The computer monitors the position readings provided by the interferometer (block 82), and if the desired reading is obtained for a predetermined minimum amount of time (block 83), the acquisition module 20 is activated (block 84). This is so despite the fact that the stage may not have completely settled. Thus, the computer can use video data at this point (indicated by an asterisk in Table 1 and an arrow 40 in FIG. 7) to accurately calculate the offset of the alignment target (block 87) and determine what correction to apply to the stage control signals (block 88). If the computer were to wait until the stage was at the target position for a sufficient amount of time to indicate that complete stability had been attained (at t=0.45 indicated by arrow 42 in FIG. 7B), the delay in the acquisition of video data would result in a significant slowing of the alignment procedure. In the example shown, each alignment procedure would be slowed down by a time T equal to two hundred and twenty milliseconds. Thus, for an entire wafer, the initiation of the data acquisition at the earlier point provides a substantial improvement in throughput of the system.

Thus, by initiating the acquisition of video data prior to the stage coming to a complete rest, the speed of the alignment procedure of each die site can be significantly increased. This is so even though the stage is still brought to a stop (or at least to a near stop) at the target position in order to obtain video data. In order to increase the speed of the alignment procedure even further, the stage need not be stopped at the target position. Instead, the stage is slowed to an extent which still enables a useable video scan to be made. In this instance, it must be insured that the speed of the stage as it passes the target position is slow enough so that any blurring of the image may be ignored by calculations in the computer.

Typically, the highest speed of the stage movement is on the order to two to three inches per second. In the embodiments thusfar described, the scanning rate of the camera (between 1/30 and 1/60 of a second to scan an entire field) is such that the stage must either be stopped at the target position (or at least slowed significantly) in order to obtain useful video data. In order to avoid the necessity of slowing down even by a slight amount, the standard video camera may be replaced with an extremely high speed camera. This high speed acquisition capability eliminates the need to stop the stage at the target position in order to view the alignment target. Instead, the stage is moved from one die site to the next in a single uninterrupted motion. As the stage passes the target position for the second die site, the alignment target is viewed by the camera and the video data is acquired by the acquisition module. As the stage moves from the target position to the expected exposure position, the computer utilizes the video data to calculate an offset so as to move the stage to a corrected exposure position (block 88) in order to achieve precise alignment between the circuit pattern already on the wafer and the pattern to be exposed.

In summary, the present invention provides a method for increasing the throughput of a step-and-repeat exposure system by reducing the time it takes to achieve alignment at each die site. The method results in significantly increased throughput for the system while retaining the benefits provided by die-by-die alignment.

I claim:

1. In an exposure system in which a plurality of overlapping patterns are exposed onto a semiconductor wafer in a step-and-repeat fashion, wherein each pattern formed during an initial step-and-repeat operation includes an associated alignment target and subsequent patterns are aligned with the initial patterns by viewing the alignment targets, a method for increasing the throughput of the system comprising the steps of:

stepping the wafer toward a predetermined target position while monitoring the position of the wafer;

viewing an area on the wafer which includes the target, wherein the viewing is intiated after the wafer has arrived at the target position but prior to the wafer coming to acomplete stop at the target position; moving the wafer toward an expected exposure position immediately upon completion of the viewing of the wafer;

calculating, as a function of the position of the target when the wafer is at the target position, the offset of the initially exposed pattern with respect to its desired position, wherein said calculating is done while the wafer is being moved;

moving the wafer toward a corrected exposure position in response to the offset calculation; and exposing a subsequent pattern onto the wafer after it has arrived at the corrected exposure position.

2. The method of claim 1 wherein the step of viewing includes the step of scanning the area of the wafer with a video camera.

3. The method of claim 2 wherein the step of viewing includes the steps of continuously scanning with the camera and storing the results of a scan taken when the wafer is at the target position, wherein the stored results are used to calculate the offset of the patterns.

4. The method of claim 2 wherein the step of viewing is done with a high speed camera and is done immediately upon arrival of the wafer at the target position and wherein the velocity of the wafer as it passes the target position is maintained constant.

5. The method of claim 2 wherein the wafer is brought to a stop at the target position.

6. In an exposure system in which a semiconductor wafer is stepped and repeated to repeatedly expose a pattern onto a semiconductor wafer and additional patterns are exposed over initial patterns in an overlapping relationship, wherein the initial patterns include an alignment target which is viewed with a scanning video camera to determine alignment between initial and subsequent patterns, wherein alignment is achieved by initially moving the wafer to a predetermined target position and determining the offset of the alignment target with respect to its expected position and subsequently moving the wafer to an exposure position which is determined as a function of said offset, the improvement for increasing the throughput of said system, comprising the steps of:

stepping the wafer toward a target position;

initiating the acquiring of data from a video scan after the wafer has arrived at the target position and has begun to stop but prior to the wafer coming to a complete stop;

starting to move toward an expected exposure position immediately upon the acquisition of data for a complete video scan;

calculating, as a function of the acquired data, a corrected exposure position; and moving the wafer to the corrected exposure position and exposing a pattern on the wafer.

7. In an exposure system in which a plurality of overlapping patterns are exposed onto a semiconductor wafer in a step-and-repeat fashion, wherein each pattern formed during an initial step-and-repeat operation includes an associated alignment target and subsequent patterns are aligned with the initial patterns by viewing the alignment targets, a method for increasing the throughput of the system comprising the steps of:

stepping the wafer toward a predetermined target position while monitoring the position of the wafer;

viewing an area on the wafer which includes the target to thereby determine the actual position of the target when the wafer is at said predetermined target position, wherein the viewing is initiated after the wafer has arrived at said predetermined target position but prior to the wafer coming to a complete stop at said predetermined target position;

moving the wafer toward an expected exposure position which is a predetermined distance from said predetermined target position immediately upon completion of the viewing of the wafer;

correcting the movement of said wafer toward said expected exposure position in accordance with the determined actual position of the target when the wafer is at said predetermined target position, wherein the correcting is performed while the wafer is being moved; and exposing a subsequent pattern onto the wafer after it has arrived at the corrected exposure position.

8. In an exposure system in which a plurality of overlapping patterns are exposed onto a semiconductor wafer in a step-and-repeat fashion, wherein each pattern formed during an initial step-and-repeat operation includes an associated alignment target and subsequent patterns are aligned with the initial patterns by viewing the alignment targets, wherein the wafer is carried on a stage, a method for increasing the throughput of the system comprising the steps of:

stepping the stage toward a predetermined target position while monitoring the position of the stage;

viewing an area on the wafer which includes the target, wherein the viewing is initiated after the stage has arrived at the predetermined target position but prior to the cessation of motion of the stage to determine the offset of the actual target position with respect to said predetermined target position;

moving the stage toward an expected exposure position which is a predetermined distance from said predetermined target position immediately upon completion of the viewing of the wafer;

correcting said movement of said stage toward said expected exposure position in accordance with said offset determined from said viewing, wherein said correcting is done while the wafer is being moved; and exposing a subsequent pattern onto the wafer after the stage has arrived at the corrected exposure position.

* * * * *